Jan. 20, 1931.  A. MEISSNER  1,789,369
MEANS FOR INDICATING CHANGES IN GASES
Filed June 30, 1927
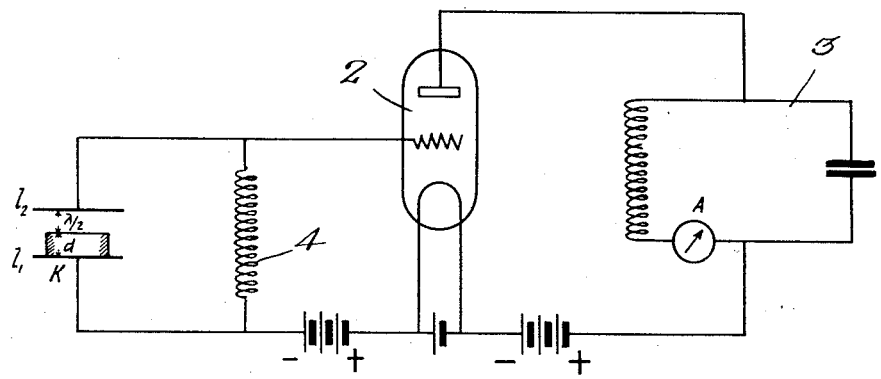
INVENTOR
ALEXANDER MEISSNER
BY *Ira J. Adams*
ATTORNEY Patented Jan. 20, 1931

1,789,369

UNITED STATES PATENT OFFICE

ALEXANDER MEISSNER, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY

MEANS FOR INDICATING CHANGES IN GASES

Application filed June 30, 1927, Serial No. 202,482, and in Germany August 10, 1926.

This invention relates to an electrical system for indicating changes in gases.

The present method is based upon the underlying principle that gases to be investigated for instance, marsh gas or fire-damp, are admitted into a space in which acoustic resonance is produced by an electrical system. Every alteration of the gas, such as the addition of hydrogen particles, causes detuning of the resonance condition on account of the fact that due to such new composition of the gas, the speed of acoustic propagation inside the space is changed so that the half-wave length required for the resonance phenomena at a constant frequency has been changed. This causes detuning of the resonance space with reference to the constant frequency of the electrical system exciting the space, whereby a reaction upon the electrical system, for instance, a change in the energy-yield of the electrical system is produced. Consequently alterations in the state of the gas can be rendered perceivable, for instance, by the aid of the energy indicators associated with the system.

The drawing shows one of a great number of ways and means whereby this method may be carried into practice.

In this embodiment, for raising the sensitivity and for reducing of the size of the apparatus, recourse is had to high frequency energy. The electrical exciting system consists of a piezo-electric body, being adapted to act as the generator of the exciting impulses. The assembly of the arrangement is illustrated in the accompanying drawing.

A piezo-electric crystal K is excited to oscillate at its own natural frequency between the electrode surfaces $1_1$ and $1_2$. The high frequency energy which is produced may be indicated, for instance, by the ammeter A. By virtue of the oscillations of said crystal, the surrounding air will be set in motion. In the present example, the assumption is made that the crystal oscillates in the direction of its thickness so that the wave is governed by the thickness $d$. The chief acoustic action then takes place at right angles to the upper surface of the crystal. Now, if the distance between the upper surface of the crystal and the surface of the electrode $1_2$ just happens to be one-half of the acoustic wave-length, in other words, if it is equal to $$\frac{v}{2n}$$

where $v=$velocity of sound, and $n$ the frequency of the crystal, or if this distance is an odd multiple of the said half-wave length, then the column of air above the oscillating surface of the crystal will be caused to oscillate in resonance. This means that a very marked acoustic counter action will be produced upon the crystal. The crystal will be subject to marked acoustic damping, and the oscillation indicator, for instance, the ammeter A will give a minimum reading.

If a gas having a different composition happens to get in the space separating the crystal and $1_2$, the velocity of the sound $v$ will be changed, with the result that $\lambda/2$ will be altered and will no longer correspond to the distance between the crystal and $1_2$. The distance between the upper face of the crystal and the electrode $1_2$ ceases to correspond to the period of the crystal, and the latter will no longer be subject to acoustic damping. The result is that the oscillation indicator A will show a greater deflection. In this manner, the composition of the gas could be directly read on the indicator instrument A.

When the crystal K and its electrodes are placed in a chosen gaseous medium and when electrode $1_2$ is spaced a distance away from the upper surface of crystal K equal to one or an odd multiple of one half of the wave length of sound, in that gaseous medium, of a frequency corresponding to the natural mechanical period of the crystal K, the mechanical vibration of crystal K will be greatly damped. At this particular spacing of electrode $1_2$ ammeter A will give a minimum reading.

When any other gas other than the chosen one is passed over the electrodes and the crystal K, the damping just described will be lessened due to the fact that in a different medium the spacing will no longer correspond to one half of a wave length or an odd multiple thereof. Ammeter A will therefore, depending upon the differing gaseous media used give different and increased readings. By suitably calibrating the ammeter A the exact kind of gas in which the crystal and its electrodes $1_1$ and $1_2$ are placed may readily be determined.

It will be understood that a convenient relay in accordance with the deflections corresponding to the change in energy could be caused to produce an indication, or other suitable means could be used for the same purpose.

I claim as my invention:

1. An electron discharge device having coupled input and output circuits, a piezo electric crystal in the input circuit, an indicating device in the output circuit, electrodes for said piezo electric crystal, one of said electrodes being spaced from a surface of said crystal a distance equal to one half the wave length of sound having a frequency corresponding to the natural mechanical period of said crystal in a chosen gaseous medium.

2. An electron discharge device having coupled input and output circuits, a piezo electric crystal in the input circuit, an ammeter in the output circuit, electrodes for said piezo electric crystal, one of said electrodes being spaced from a surface of said crystal a distance equal to one half the wave length of sound having a frequency corresponding to the natural mechanical period of said crystal in a chosen gaseous medium.

3. A thermionic oscillator having input and output circuits, a piezo electric crystal in the input circuit for maintaining the frequency of said oscillator constant, an indicating device associated with the output circuit, electrodes for said piezo electric crystal, one of said electrodes being spaced from a surface of said crystal a distance equal to an odd multiple of one half the wave length of sound having a frequency corresponding to the natural mechanical period of said crystal in a chosen gaseous medium.

4. A thermionic oscillator having input and output circuits, a piezo electric crystal in the input circuit for maintaining the frequency of said oscillator constant, an ammeter in the output circuit, electrodes for said piezo electric crystal, one of said electrodes being spaced from a surface of said crystal a distance equal to an odd multiple of one half of the wave length of sound having a frequency corresponding to the natural mechanical period of said crystal in a chosen gaseous medium.

ALEXANDER MEISSNER.